US012669966B2

(12) United States Patent
Wilson et al.

(10) Patent No.: US 12,669,966 B2
(45) Date of Patent: Jun. 30, 2026

(54) SYSTEM AND METHOD TO ALLOCATE AND ADMINISTER GUEST PRINTING

(71) Applicant: Toshiba TEC Kabushiki Kaisha, Shinagawa-ku (JP)

(72) Inventors: Silvy Wilson, Rancho Santa Margarita, CA (US); Chris Nguyen, Huntington Beach, CA (US); Marianne Kodimer, Huntington Beach, CA (US)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 236 days.

(21) Appl. No.: 18/444,481

(22) Filed: Feb. 16, 2024

(65) Prior Publication Data

US 2025/0265022 A1 Aug. 21, 2025

(51) Int. Cl.
*G06F 3/12* (2006.01)

(52) U.S. Cl.
CPC .......... *G06F 3/1204* (2013.01); *G06F 3/1222* (2013.01); *G06F 3/1238* (2013.01); *G06F 3/1287* (2013.01)

(58) Field of Classification Search
CPC .... G06F 3/1204; G06F 3/1222; G06F 3/1238; G06F 3/1287; G06F 3/1288
See application file for complete search history.

(56) References Cited

U.S. PATENT DOCUMENTS

2023/0409255 A1* 12/2023 Miyoshi ................. G06F 3/126

* cited by examiner

*Primary Examiner* — Christopher Wait
(74) *Attorney, Agent, or Firm* — Kim & Stewart LLP

(57) ABSTRACT

A system and method is provided for creating and administering a guest user's document processing operations, such as printing, on a host company network sharing the same cloud print service as the guest's company network. The host network administrator generates a list of companies that are pre-approved for users from a guest company. The guest user logs into the host network and views a list of pre-approved companies. The user selects one or more approved companies for which they are already approved. The user selects a PIN which is then associated with their information, approved companies and guest company. The user then submits their job to the cloud print service for release by a host company MFP. The user logs into a selected host company MFP with their PIN and a listing of any related, pending job is displayed. The user may select one or more jobs for release and printing. The PIN may be revoked by the host administrator, timeout or expire when a selected number of printouts has been made.

20 Claims, 5 Drawing Sheets

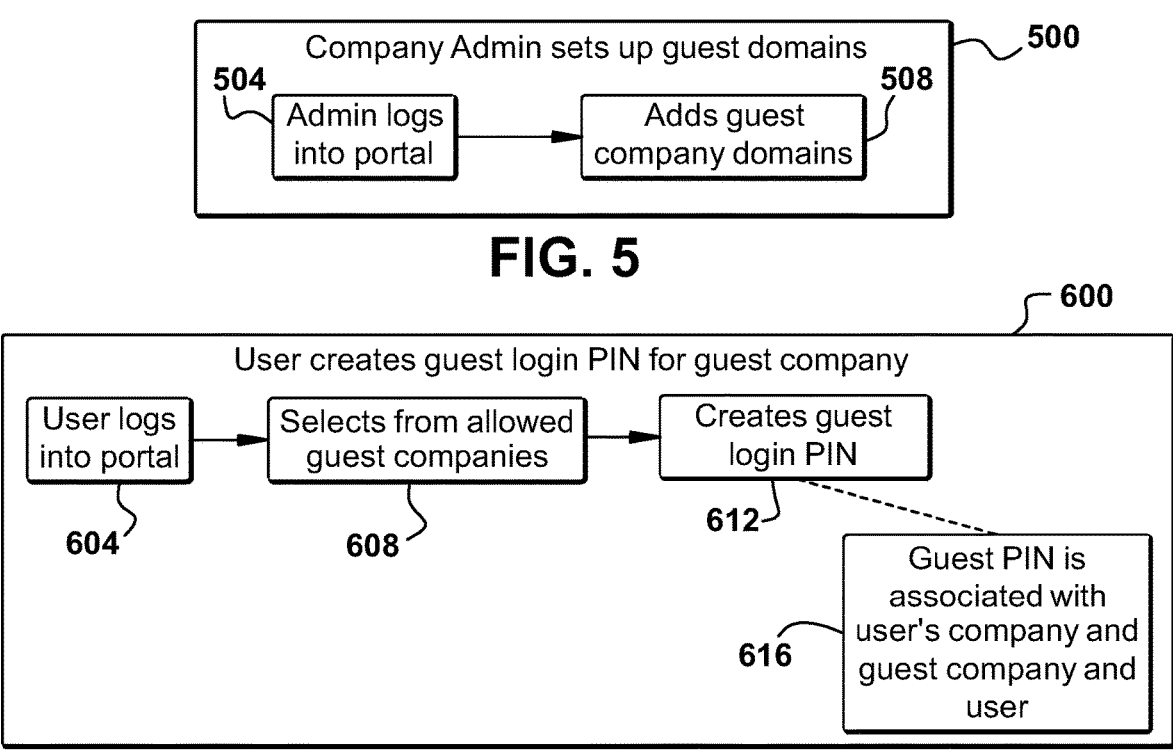
FIG. 5
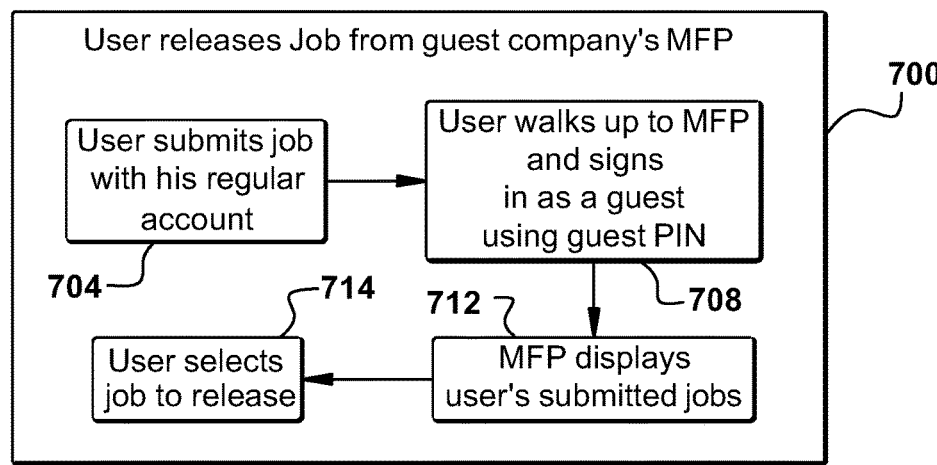
FIG. 6
FIG. 7
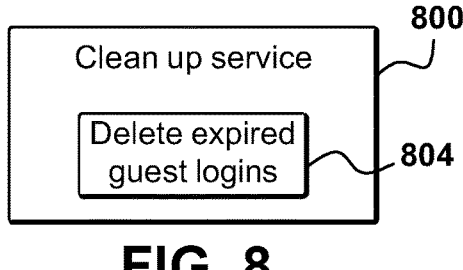
FIG. 8

SYSTEM AND METHOD TO ALLOCATE AND ADMINISTER GUEST PRINTING

TECHNICAL FIELD OF THE INVENTION

This application relates generally to document processing operations, such as network printing. The application relates more particularly to assigning and managing of printing rights for guest users.

BACKGROUND OF THE INVENTION

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Companies or other institutions frequently have one or more MFPs in their network. Access and use is typically controlled by administrators. Users may send a document processing job, such as a print job, to a selected MFP. They then login to the MFP with their user credentials, and are then able to release their jobs. A problem arises when company guests wish to print their jobs. In one example, an administrator must create a guest login account for each such guest. This can be very time consuming, particularly with large companies having many visitors.

The forgoing can be even more complex when printing is done in connection with a cloud printing service (CPS). Cloud printing services allow users to print from any device connected to the Internet. Users can send print jobs remotely without being physically near the printer, such as by sending jobs from a workstation or portable device. Cloud print services can eliminate a need for local printer drivers on individual devices. Print jobs are routed through a cloud data center to the printer. Users can easily discover available printers without manual setup. Cloud surface printing also provide flexibility for an anywhere workforce, enabling productivity from various locations.

BRIEF DESCRIPTION OF THE DRAWINGS

Various embodiments will become better understood with regard to the following description, appended claims and accompanying drawings wherein:

FIG. 5 is a block diagram of an example embodiment of an action of a host company administrator;

FIG. 6 is a block diagram of an example embodiment of actions of a guest user;

FIG. 7 is a block diagram of an example embodiment of an action of a guest user releasing listed jobs or jobs for processing; and FIG. 8 is a block diagram of an example embodiment of a cleanup action for an expired PIN.

DETAILED DESCRIPTION OF THE INVENTION

Figure 1:
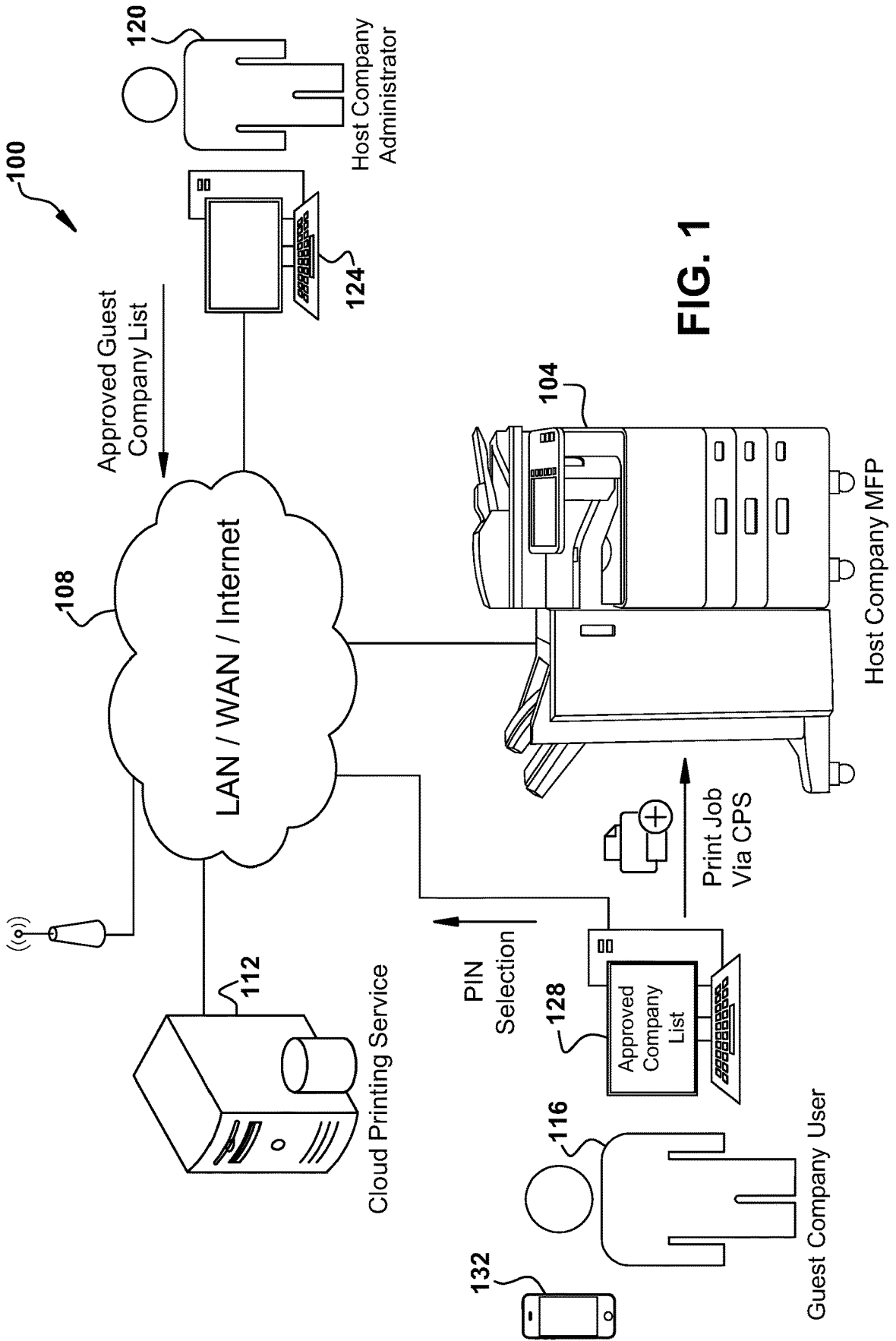
FIG. 1 an example embodiment of a system to allocate and administer guest printing.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Cloud print services may register users based on a business associated with a domain name of their email address. Many businesses can serviced by the same cloud print service. Cloud printing allows users to print to the cloud and release their jobs from any MFP registered with their system as long as the user and the MFP belong to the same company. Users are associated to a company through pre-configured company domains. For example, a user with an email domain company A.com can automatically register with the company that owns companyA.com domain in the system. Once a user is registered, the same email address may be precluded from registration with any other company serviced by the same cloud print service. When a user submits a print job, the print job is associated with the company and the user. The user can only release jobs associated with their company and themselves. In addition, the user may not be able to release jobs at MFPs owned by other companies. When guests visit a company, they are therefore prevented from printing their jobs at the guest company's MFPs even though they are registered to a common cloud printing service, but belonging to a different company.

As used herein, a host company refers to the company who owns the MFPs and allows guest printing and a guest company refers to the company whose employees visit the host company. Example embodiments herein provide a system and method that allows a visitor to print without having to create a guest account for every visitor.

In example embodiments detailed herein, instead of the company administrator creating a guest user, the host company administrator adds a company as a guest company. This privilege can be revoked any time. Users from companies that have guest company privileges can choose to generate a guest MFP login PIN for themselves for the host company. The administrator can configure the time-to-live duration of the PIN, which may be short-lived. The guest logs into the host MFP as a guest using the guest login PIN. The guest is then able to see the submitted jobs that they submitted, appearing as a regular user for the host company, and release the jobs. This allows host company administrators to control which companies are given guest company privileges. The system can also be configured such that all companies with a top domain are considered as guest domains automatically. Thus, companies with email domains of xyz.abc.com and pqrs.abc.com are automatically considered guest companies of one another. Companies can negotiate which company, such as the guest or the host, pays for document processing jobs. This allows a user who is registered with a different company to release their jobs on an MFP registered with a company other than their own. This also allows host companies to configure a company as a guest company. Automatically allowing companies with same top domain to be configured as a guest company is suitably used. Companies can decide how long a guest company privilege or a guest PIN is valid. Companies can further decide whether the guest jobs should be counted against the host company or the guest company.

In a particular example, a user, CompanyBuser1@companyB.com from Company B, is a registered user with a cloud printing service and is visiting Company A in the same region. They cannot release jobs that were submitted to the commonly used cloud printing service from any of Company A's MFPs. In this example, Company A's administrator configures which companies qualify as guest companies and the maximum duration for an MFP guest login from their portal. It could be that Company A does not allow this feature at all. Systems are suitably configured such that companies with matching top level domains are automatically guest companies of each other.

In a further example, a Company B user logs into the cloud printing portal and creates a guest login PIN for any company that Company B allows as a guest. The guest login PIN is associated with the user, his company (Company B) and the host company (Company A). When CompanyBuser1 logs in as a guest on a Company A MFP, they are validated as a Company A guest user. At the same time, the cloud printing service also knows the guest user's actual company and therefore is able to display the documents that the guest user has submitted from their own company (Company B) account. Since the guest login PINs are associated with both guest and host companies, the cost of the job can be attributed to either company based on agreements between the two companies.

FIG. 1 illustrates and example embodiment of a system 100 to allocate and administer guest printing. One or more MFPs, such as MFP 104, are in data communication via network cloud 108, suitably comprised of a local area network (LAN), a wide area network (WAN), which may comprise the Internet, or any suitable combination thereof. Network cloud 108 is comprised of any suitable wireless or wired data connection or combination thereof and provides for data transfer between devices. Also in data communication with network cloud 108 is cloud printing service 112. In the illustrated example, cloud printing service 112 manages printing for a hosting company and a user visiting from a guest company who wishes to obtain a printout while on the host company premises. Guest company user 116 wishes to send their document processing job, such as a print job, for rendering on MFP 104. Their print job may be sent from any suitable device in data communication with network cloud 108, such as via workstation 128 or smartphone or tablet 132.

Prior to the forgoing, host company administrator generates an approved company list, suitably on workstation 124. Any visiting user having an email address domain associated with an entry on the approved company list can be authorize for guest printing. The approved company list is provided to guest company user 116, suitably shown on a display of user interface of workstation 128. Guest company user 116 makes a selection of one or approved company for which they have printing rights. This may be a company associated with the domain name of their email address if it is an approved option. There may also be one or more companies in different domains where the user is approved. Once the user is associated with an approved company, they are prompted to create a PIN. Once a PIN is created, their print job can be sent to one or more targeted MFP, such as MFP 104. Their selected PIN is associated with guest company user 116, the company associated with their email domain, and each selected guest company for which they are approved. Insofar cloud printing service 112 is in use, their job is held pending release from an MFP. User then approaches MFP 104 and logs in with their PIN. If the PIN is valid, the user is validated as a host company user. A list is displayed including their print job suitably with other jobs associated with the user or the user's company.

Figure 2:
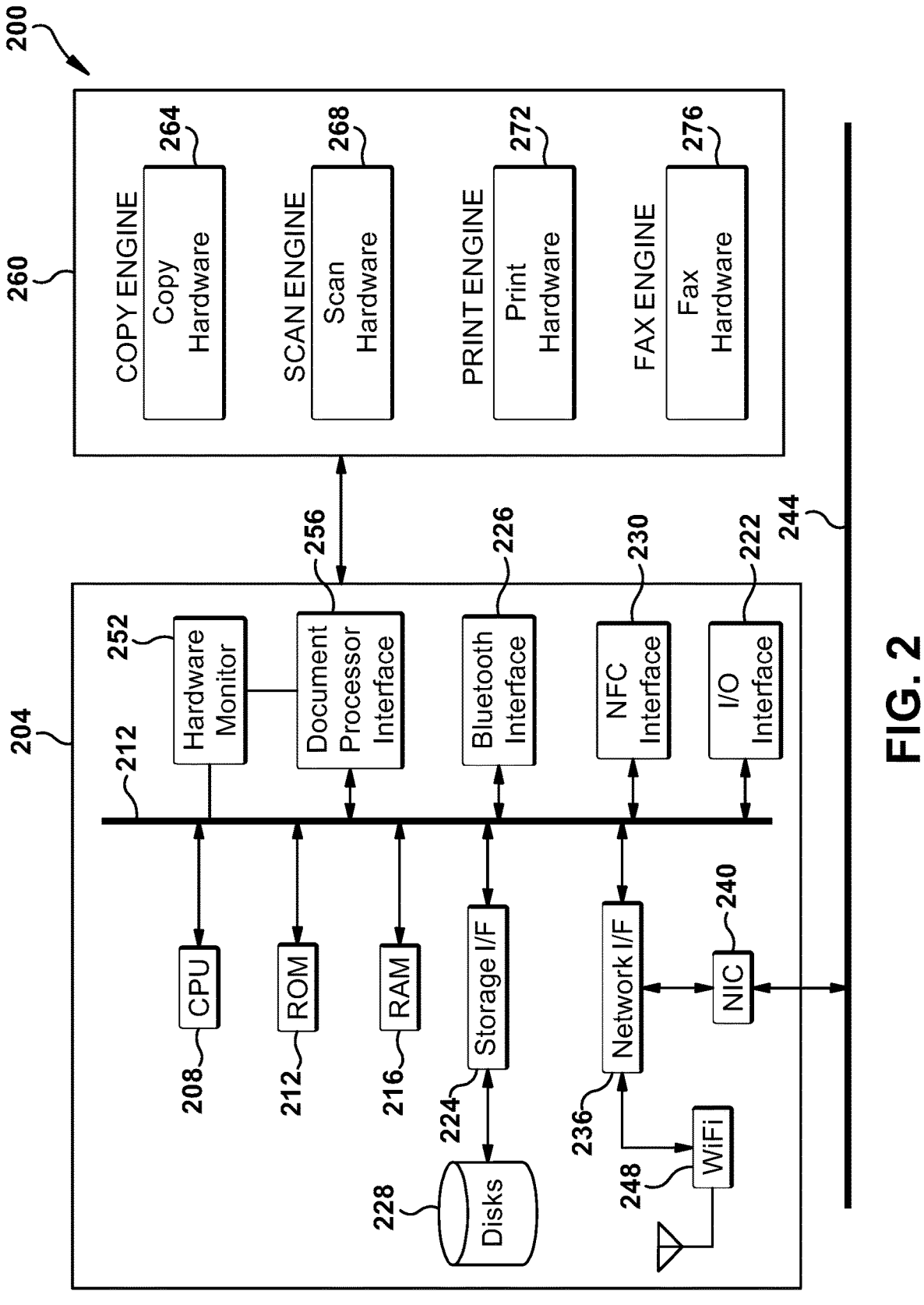
FIG. 2 is an example embodiment of a networked digital device, such as a multifunction peripheral.

Turning now to FIG. 2, illustrated is an example embodiment of a networked digital device comprised of document rendering system 200 suitably comprised within an MFP, such as with MFP 104 of FIG. 1. It will be appreciated that an MFP includes an intelligent controller 204 which is itself a computer system. Thus, an MFP can itself function as a server with the capabilities described herein. Included in intelligent controller 204 are one or more processors, such as that illustrated by processor (CPU) 208. Each processor is suitably associated with non-volatile memory, such as read-only memory (ROM) 212, and random access memory (RAM) 216, via a data bus 220.

Processor 208 is also in data communication with input/output interface 222, suitably comprising a user touchscreen. While touchscreens are discussed in example embodiments herein, it is to be appreciated that any suitable user interface, such as keyboards, switches, displays, trackballs or mice may be used.

Processor 208 is also in data communication with a storage interface 224 for reading or writing to a storage 228, suitably comprised of a hard disk, optical disk, solid-state disk, cloud-based storage, or any other suitable data storage as will be appreciated by one of ordinary skill in the art.

Processor 208 is also in data communication with additional interfaces, such as Bluetooth interface 226 and NFC interface 230.

Processor 208 is also in data communication with a network interface 236 which provides an interface to a network interface controller (NIC) 240, which in turn provides a data interface to any suitable wired interface or physical network connection 244, or to a wireless data connection via wireless network interface 248. Example wireless network interfaces include optical, cellular, Wi-Fi, wireless universal serial bus (wireless USB), satellite, and the like. Example wired interfaces include Ethernet, USB, IEEE 1394 (Fire Wire), Lightning, telephone line, or the like.

Processor 208 can also be in data communication with any suitable user input/output (I/O) network interface 222 which provides data communication for interfacing with user peripherals, such as displays, keyboards, mice, track balls, touch screens, or the like. Processor 208 can also be in communication with hardware monitor 252, such as a page counter, temperature sensor, toner or ink level sensor, paper level sensor, or the like.

Also in data communication with data bus 220 is a document processor interface 256 suitable for data communication with the document rendering system 260, including MFP functional units. In the illustrated example, these units include a scan engine comprising copy engine hardware 264, scan engine comprise of scan engine hardware 268, a print engine comprised of print engine hardware 272 and a fax engine comprised of fax engine hardware 276, which together comprise document rendering system 260. It will be understood that functional units are suitably comprised of intelligent units, including any suitable hardware or software platform.

Figure 3:
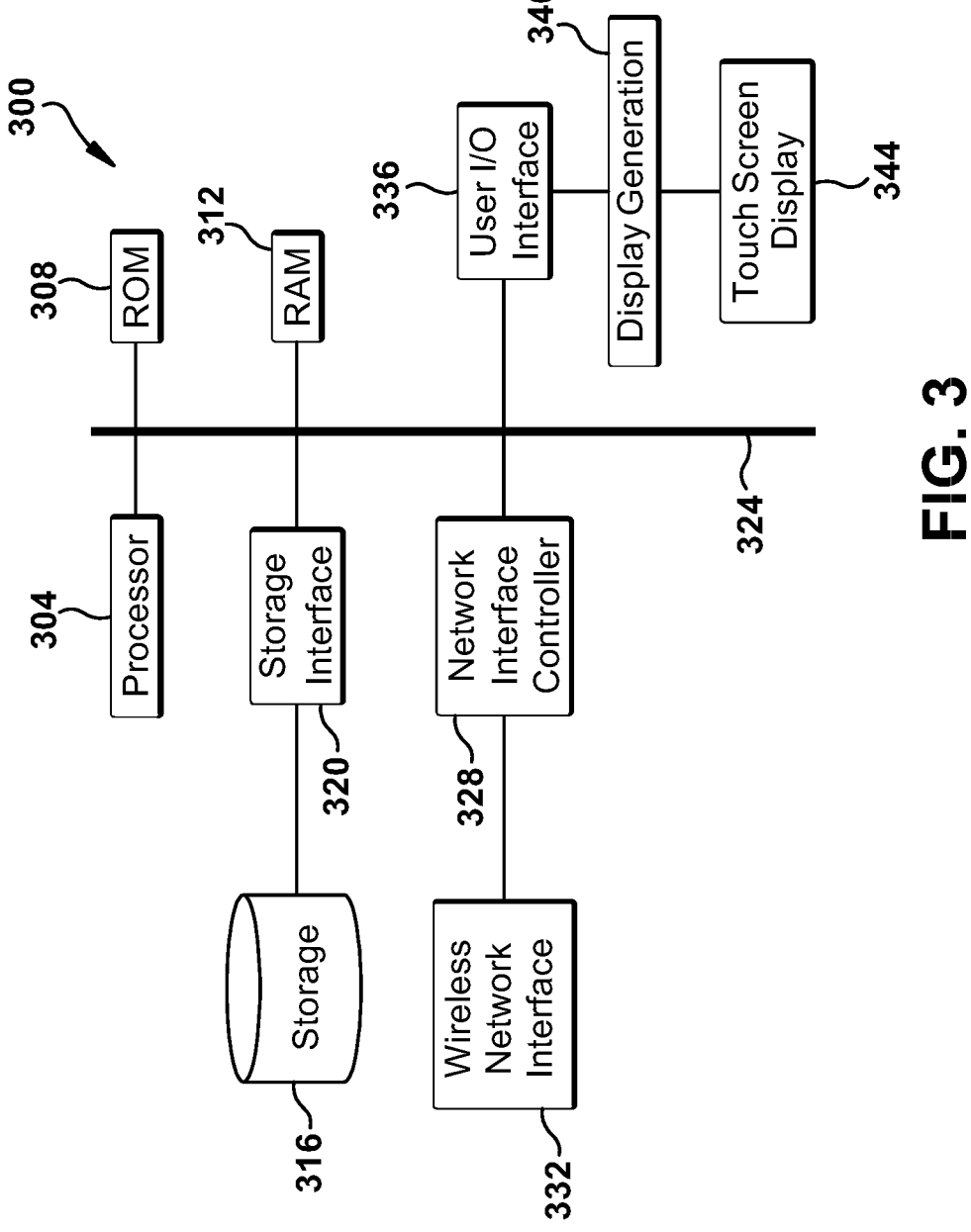
FIG. 3 is an example embodiment of a digital device system.

Turning now to FIG. 3, illustrated is an example embodiment of a digital data processing device 300 such as cloud printing service server 112, workstations 124 and 128 and smartphone or tablet 132 of FIG. 1. It is to be appreciated that some components listed may be unnecessary in certain configurations. Components of the digital data processing device 300 suitably include one or more processors, illustrated by processor 304, memory, suitably comprised of read-only memory 308 and random access memory 312, and bulk or other non-volatile storage 316, suitably connected via a storage interface 320. Data communication among components is accomplished via data bus 324. A network interface controller 328 suitably provides a gateway for data communication with other devices, via any wireless or wired connection, such as via wireless network interface 332 or wired. A user input/output interface 336 is suitably comprised of display generator 340 interfacing with touchscreen display 344. As noted above, any suitable user input and display can be used.

Figure 4:
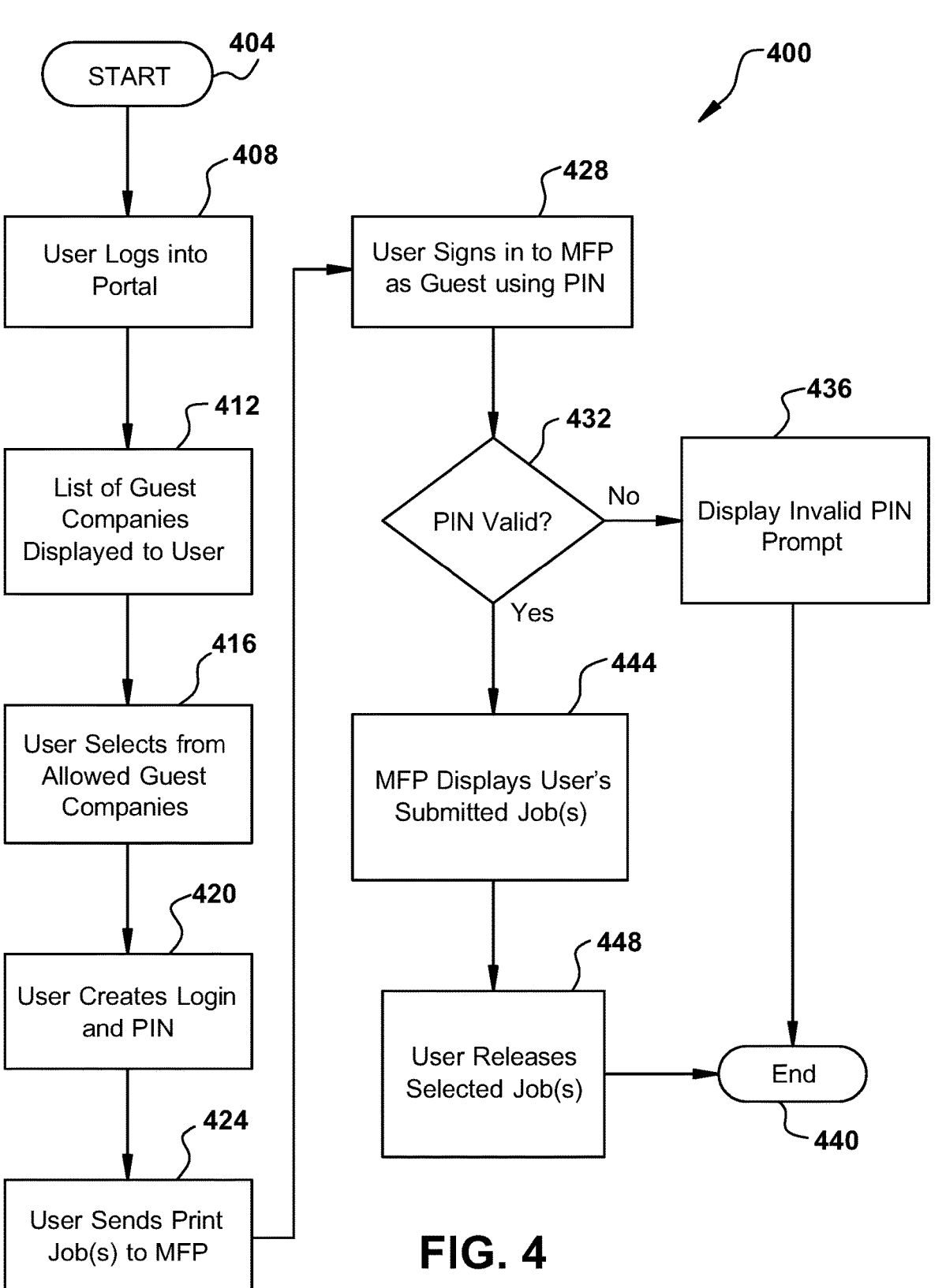
FIG. 4 is a flowchart for an example embodiment of a system to allocate and administer guest printing.

FIG. 4 illustrates a flowchart 400 for an example embodiment of a system to allocate and administer guest printing. The process commences at block 404 and a guest user logs into a host network portal at block 408. The user's login generates a display of an approved company list at block 412. The user selects one or more company from this list for which they are approved at block 416. The user is then prompted to create a PIN which is created at block 420. The user then sends one or more print job to a select MFP the host company at block 424. The user approaches their selected MFP and signs in with their PIN via its user interface at block 420. A check is made at block 432 to determine if the entered PIN is valid. An invalid PIN may result from user input error, privileges revoked by a network administrator or a timeout of a limited duration PIN. A PIN may also suitably expire once a preset quota of document processing operations has been made. One or more expired PIN associated with a pending guest company queue may suitably trigger deletion of one or more corresponding print jobs from the queue. If the PIN is determined to be invalid, a suitable message to the user is displayed at block 436 and the process ends at block 440. If the PIN is determined to be valid, a list of the user's pending job or jobs, which may be accompanied by a listing of other jobs in an approved company associated with the user, is shown at block 444. The user then releases one or more jobs for printing at block 448, after which the process ends at block 440.

FIG. 5 illustrates block diagram 500 showing an example embodiment of an action of a host company administrator. The administrator logs in to a portal of the host company network at block 504 and creates a list of approved guest companies at block 508. The administrator system can be set such that any company sharing a top level domain, or any selected domain tree, is automatically added as an approved company.

FIG. 6 is a block diagram 600 an example embodiment of actions of a guest user. The user logs into a portal of the host company network at block 604, and proceeds to select from a listing of approved companies at block 608. After selection, the user is prompted to create a PIN which is created at block 612. This PIN is then associated with the user's company, one or more approved guest companies, as well as the user.

FIG. 7 is a block diagram 700 of an example embodiment of an action of a guest user releasing listed jobs or jobs for processing. The user submits their job using their regular account at block 704. The user then approaches an MFP selected for their job and logs in with their PIN at block 708. The user's job or jobs, and possibly one or more jobs from other users with a shared company, is displayed at block 712. The user then selects each job desired for release at block

714, and the jobs are processed as if the user was approved under the host company network.

FIG. 8 is a block diagram 800 of an example embodiment of a cleanup action for an expired PIN. As PINs expire, their associated account is deleted at block 804.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a user interface including one or more user inputs and one or more displays;
a data interface configured to receive an authorized guest company list into memory; and
one or more processors configured to
receive a user login via the user interface,
show indicia corresponding to the guest company list on the user interface,
receive a company selection from the guest company list from a user via the user interface,
show a PIN selection prompt on the user interface,
receive a PIN selection from the user responsive to the PIN selection prompt via the user interface,
associate the selected PIN with the selected guest company,
send a document processing job associated with the user to an image rendering device,
receive a login from the user using the selected PIN,
show indicia corresponding to the document processing job on the user interface,
receive a selection of the indicia corresponding to the document processing job from the user via the user interface, and
release the document processing job for printing by an associated print engine responsive to the selection of the indicia.

2. The system of claim 1 wherein the one or more processors are further configured to determine whether the PIN selection is valid and selectively release the document processing job based on a determined validity of the selected PIN.

3. The system of claim 2 wherein validity of the PIN is determined in accordance with a duration of time following the PIN selection.

4. The system of claim 2 wherein the guest company list includes companies associated with the same top level domain.

5. The system of claim 2 wherein the one or more processors are further configured to determine a cost associated with completion of the document processing job and associate the determined cost to the selected guest company.

6. The system of claim 2 wherein the one or more processors are further configured to show indicia corresponding to all pending document processing jobs associated with the selected guest company on the user interface after the user login.

7. The system of claim 2 wherein the one or more processors are further configured to delete pending document process jobs associated with the user when the PIN is determined to be invalid.

8. A method comprising:

receiving an authorized guest company list into memory via a data interface;

receiving a user login via a user interface including one or more user input and one or more displays;

showing indicia corresponding to the guest company list on the user interface;

receiving a company selection from the guest company list from a user via the user interface;

showing a PIN selection prompt on the user interface;

receiving a PIN selection from the user responsive to the PIN selection prompt via the user interface;

associating the selected PIN with the selected guest company;

sending a document processing job associated with the user to an image rendering device;

receiving a login from the user using the selected PIN;

showing indicia corresponding to the document processing job on the user interface;

receiving a selection of the indicia corresponding to the document processing job from the user via the user interface; and releasing the document processing job for printing by an associated print engine responsive to the selection of the indicia.

9. The method of claim 8 further comprising determining whether the PIN selection is valid and selectively releasing the document processing job based on a determined validity of the selected PIN.

10. The method of claim 9 further comprising determining the validity of the PIN in accordance with a duration of time following the PIN selection.

11. The method of claim 9 wherein the guest company list includes companies associated with the same top level domain.

12. The method of claim 9 further comprising determining a cost associated with completion of the document processing job and associating the determined cost to the selected guest company.

13. The method of claim 9 further comprising showing indicia corresponding to all pending document processing jobs associated with the selected guest company on the user interface after the user login.

14. The method of claim 9 further comprising deleting pending document process jobs associated with the user when the PIN is determined to be invalid.

15. A method comprising:

receiving company data identifying guest companies into memory;

generating a guest printing permission list in accordance with the received company data;

sending the permission list to an associated multifunction peripheral via a data interface;

receiving a guest company selection from the permission list via the data interface;

receiving a PIN selection corresponding to the selected guest company via the data interface;

associating the selected PIN with the selected company;

receiving a user login with the selected PIN via the data interface;

determining validity of the selected PIN;

sending a job list for pending document processing jobs associated with the selected company when the selected PIN is determined to be valid via the data interface;

receiving a job release selection for one or more document processing jobs in the job list; and releasing each selected document processing job for processing.

16. The method of claim 15 further comprising selectively assessing a fee to the selected company in accordance with each released document processing job.

17. The method of claim 16 wherein the fee is selectively assessed in accordance with a preset fee schedule.

18. The method of claim 15 further comprising invalidating the PIN after a selected duration of time following the PIN selection.

19. The method of claim 18 further comprising deleting one or more pending document processing jobs when the PIN is invalidated.

20. The method of claim 15 further comprising adding a plurality of companies sharing a common top level domain to the guest printing permission list.

* * * * *